US008434399B2

(12) United States Patent
Gambier et al.

(10) Patent No.: US 8,434,399 B2
(45) **Date of Patent: *May 7, 2013**

(54) OILFIELD EQUIPMENT COMPOSED OF A BASE MATERIAL REINFORCED WITH A COMPOSITE MATERIAL

(75) Inventors: Philippe Gambier, Houston, TX (US); Jean-Louis Pessin, Houston, TX (US); Garud Sridhar, Stafford, TX (US); Aparna Raman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1229 days.

This patent is subject to a terminal disclaimer.

(21) Appl. No.: 11/967,327

(22) Filed: Dec. 31, 2007

(65) Prior Publication Data

US 2009/0081034 A1 Mar. 26, 2009

Related U.S. Application Data

(63) Continuation-in-part of application No. 11/859,830, filed on Sep. 24, 2007.

(51) Int. Cl.
*F01B 11/02* (2006.01)
*F16J 10/00* (2006.01)
*F04B 39/10* (2006.01)
*F04B 53/10* (2006.01)

(52) U.S. Cl.
USPC ...................... 92/169.2; 417/567; 29/888.061

(58) Field of Classification Search ............. 29/888.061; 417/415, 454, 567; 92/169.2, 169.4, 171.1
See application file for complete search history.

(56) References Cited

U.S. PATENT DOCUMENTS

| | | | | |
|---|---|---|---|---|
| 3,000,320 | A * | 9/1961 | Ring | 417/383 |
| 3,801,234 | A | 4/1974 | Love et al. | |
| 4,074,858 | A * | 2/1978 | Burns et al. | 299/17 |
| 4,486,938 | A | 12/1984 | Hext | |
| 5,073,096 | A | 12/1991 | King et al. | |
| 5,287,621 | A | 2/1994 | Usui | |
| 5,299,921 | A | 4/1994 | Richter | |
| 5,362,215 | A | 11/1994 | King | |
| 5,382,057 | A | 1/1995 | Richter | |
| 6,463,843 | B2 * | 10/2002 | Pippert | 92/170.1 |
| 6,910,871 | B1 | 6/2005 | Blume | |
| 7,335,002 | B2 | 2/2008 | Vicars | |
| 2005/0180868 | A1 * | 8/2005 | Miller | 417/437 |
| 2006/0029502 | A1 * | 2/2006 | Kugelev et al. | 417/415 |

FOREIGN PATENT DOCUMENTS

| | | | |
|---|---|---|---|
| RU | 2098709 | C1 | 12/1997 |
| RU | 2137732 | C1 | 9/1999 |
| SU | 1566069 | A2 | 5/1990 |

OTHER PUBLICATIONS

M.G. Kabakov, S.P. Stesin, Technology for Production of Hydraulic Drives, 1974, pp. 37-42, Mashinostroenie ( The Mechanical Engineering Publishers), Moscsow.

* cited by examiner

*Primary Examiner* — Peter J Bertheaud
(74) *Attorney, Agent, or Firm* — Myron K. Stout; Daryl Wright; Robin Nava

(57) ABSTRACT

Oilfield equipment is provided that includes a base material less subject to abrasion, corrosion, erosion and/or wet fatigue than conventional oilfield equipment materials such as carbon steel, and a reinforcing composite material for adding stress resistance and reduced weight to the oilfield equipment.

19 Claims, 3 Drawing Sheets

OILFIELD EQUIPMENT COMPOSED OF A BASE MATERIAL REINFORCED WITH A COMPOSITE MATERIAL

CROSS-REFERENCE TO RELATED APPLICATION(S)

This application claims priority to and is a Continuation-in-Part of U.S. patent application Ser. No. 11/859,830, filed on Sep. 24, 2007, which is incorporated herein by reference.

FIELD OF THE INVENTION

The present invention relates generally to a method of making oilfield equipment, such as a fluid end for a reciprocating pump out, of a thin layer of a base material and reinforcing the base material with a composite material that supports the stresses incurred by the fluid end during a pump cycle. Preferably, the base material is less subject to abrasion, corrosion, erosion and/or wet fatigue than conventional fluid end materials such as carbon steel.

BACKGROUND

The fluid end of a reciprocating pump, such as a triplex pump, is the portion of the pump where a fluid is drawn in via a suction valve. A plunger then compresses the fluid and pushes it, with high pressure, through a release valve. These valves open when the pressure on the bottom side thereof is higher than the pressure on the top side thereof.

Fluid ends are often a weak point of reciprocating pumps, as they break after a certain amount of cycle time due to wet fatigue pressure cycles. In addition, it is desirable to limit the weight of fluid ends when they are used, for example, in applications such as oil well fracturing operations. In such situations the load capacity for transporting such oil well fracturing systems is limited. Accordingly, a need exits for an improved oilfield equipment, such as reciprocating pump fluid ends, that are reliable and/or light in weight.

SUMMARY

In one embodiment, the present invention includes oilfield equipment composed of a base material which is reinforced with a composite material. In one embodiment, the base material is less subject to abrasion, corrosion, erosion and/or wet fatigue than the material of conventional oilfield equipment, such as carbon steel. In one embodiment, the base material is composed of a thin layer, which is reinforced on its outer surface with a composite material. The use of the composite material increases the stress that can be withstood by the base material, while simultaneously reducing the weight of the oilfield equipment.

In an embodiment where the oilfield equipment is a reciprocating pump fluid end, only the base material is in contact with the fluid pumped by the reciprocating pump. Although such a fluid end may be used in any appropriate application, in one embodiment this fluid end is used on a reciprocating pump in an oil well fracturing operation.

DETAILED DESCRIPTION OF EMBODIMENTS OF THE INVENTION

Figure 1:
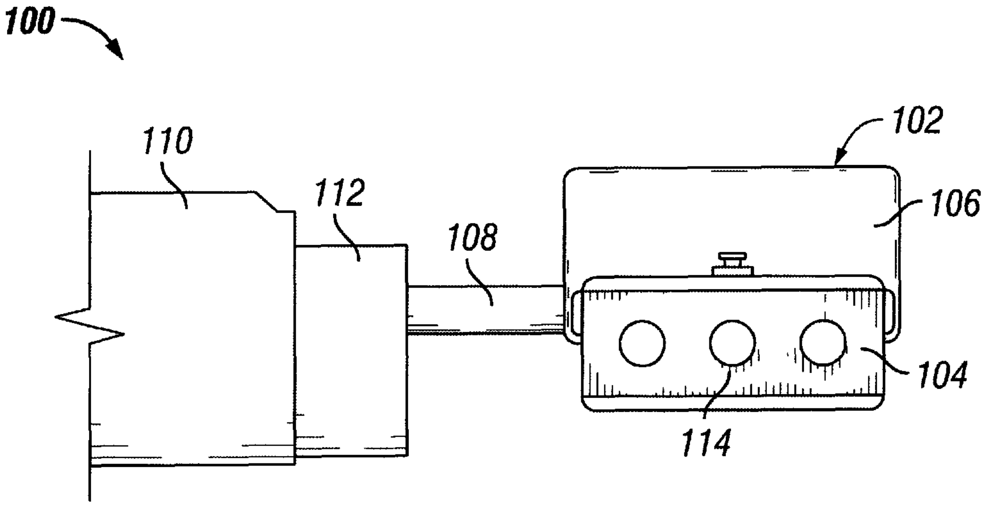
FIG. 1 is a schematic view of a pump assembly employing a reciprocating pump according to one embodiment of the present invention.

The embodiment of FIG. 1, shows a pump assembly 100 that includes a reciprocating pump 102 according to one embodiment of the present invention. As shown, the reciprocating pump 102, such as a triplex pump, includes a fluid end 104 which receives a fluid at a low pressure and discharges it at a high pressure. The pressurization of the fluid within the fluid end 104 is created by plungers 114, which reciprocate toward and away from the fluid end 104 as directed by a crankshaft, which rotates within a housing 106. The crankshaft, is driven by a driveline mechanism 108, which in turn is driven by an engine 110 through a transmission 112.

Figure 2:
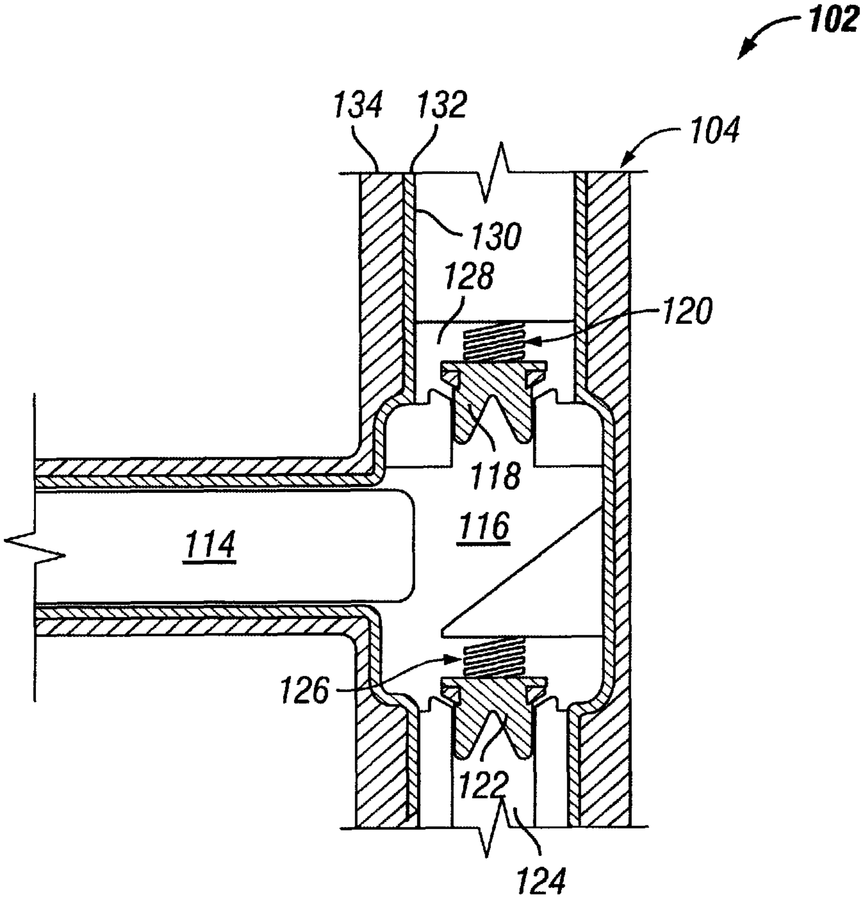
FIG. 2 is a cross-sectional view of a fluid end of the reciprocating pump of FIG. 1.

FIG. 2 shows a cross-sectional view of the fluid end 104 of the reciprocating pump 102 of FIG. 1. As shown, the pump 102 includes a plunger 114 for reciprocating within the fluid end 104 toward and away from a chamber 116. In this manner, the plunger 114 effects high and low pressures on the chamber 116. For example, as the plunger 114 is thrust toward the chamber 116, the pressure within the chamber 116 is increased.

At some point, the pressure increase will be enough to effect an opening of a discharge valve 118 to allow the release of fluid from the chamber 116, through a discharge channel 128, and out of the pump 102. The amount of pressure required to open the discharge valve 118 as described may be determined by a discharge mechanism 120 such as valve spring which keeps the discharge valve 118 in a closed position until the requisite pressure is achieved in the chamber 116.

The plunger 114 may also effect a low pressure on the chamber 116. That is, as the plunger 114 retreats away from its advanced discharge position near the chamber 116, the pressure therein will decrease. As the pressure within the chamber 116 decreases, the discharge valve 118 will close, returning the chamber 116 to a sealed state. As the plunger 114 continues to move away from the chamber 116, the pressure therein will continue to drop, and eventually a low or negative pressure will be achieved within the chamber 116.

Similar to the action of the discharge valve 118 described above, the pressure decrease will eventually be enough to effect an opening of an intake valve 122. The opening of the intake valve 122 allows the uptake of fluid into the chamber 116 from a fluid intake channel 124 adjacent thereto. The amount of pressure required to open the intake valve 122 may be determined by an intake mechanism 126, such as spring which keeps the intake valve 122 in a closed position until the requisite low pressure is achieved in the chamber 116.

As described above, a reciprocating or cycling motion of the plunger 114 toward and away from the chamber 116 within the pump 102 controls pressure therein. The valves 118,122 respond accordingly in order to dispense fluid from the chamber 116, through the discharge channel 128, and eventually out of the pump 102 at high pressure. The discharged fluid is then replaced with fluid from within the fluid intake channel 124.

Note that although only one plunger 114 is shown in FIG. 2, in embodiments where the reciprocating pump 102 is a triplex pump each of the three plungers may have the same or a similar configuration and operation to that of FIG. 2. This is also true of a quintaplex pump, or a reciprocating pump with any other number of plungers.

As mentioned above, the continued cycling of the plungers 114 into and out of the fluid end 104 of the pump 102 and the accompanied fluctuations between positive and negative pressure experienced by the inner surfaces of the fluid end 104 makes the fluid end 104 susceptible to failure.

As such, in one embodiment of the present invention, the inner surface 130 of the fluid end 104 is manufactured from a base material 132 that is less subject to abrasion, corrosion, erosion and/or wet fatigue than typical fluid end materials, such as carbon steel. Exemplary materials for such a base material 132 include inconel, incoloy, titanium and stainless steel, among other appropriate materials.

However, such base materials 132 are often expensive. As such, in one embodiment the inner surface 130 of the fluid end 104 is manufactured from a thin layer of the base material 132, and reinforced by a composite material 134, which forms the outer surface of the fluid end 104. The composite material 134 enables the fluid end 104 to support all the cyclical stresses that it will experience during operation of the pump 102 in which the fluid end 104 is used.

In one embodiment, the composite material 134 is composed of fibers and a matrix. The fibers may include, for example, glass fibers, carbon fibers, Kevlar fibers, metal fibers or any other product that would provide mechanical strength to the base material 132 of the fluid end 104, such as metal wires. The matrix may include epoxy, Peek, or another similar compound, such as any of those from the same family as epoxy or Peek, i.e. a thermoplastic material. Alternatively, the matrix may include a thermoset material.

The matrix, or resin holds the fiber of the composite material 134 in place on the base material 132 of the fluid end 104. In addition, the matrix may add mechanical strength to the base material 132 of the fluid end 104. However, it is the fiber itself that is primarily relied upon for improving the stress resistance of the base material 132 of the fluid end 104. In one embodiment, fibers that are stronger than metal in one direction are positioned adequately to support the load cycle of the fluid end 104.

This configuration not only improves the fluid end's 104 resistance to abrasion, corrosion, erosion and/or wet fatigue, but it also has the added benefit of reducing the overall weight of the fluid end 104, in embodiments where the composite material 134 weighs less than carbon steel material and/or the base material.

In another embodiment, the inner surface 130 of the fluid end 104 may be composed of a carbon steel material which is reinforced by the above described composite material 134 to both increase the overall stress resistance of the fluid end 104 and to decrease the overall weight of the fluid end 104 over typical fluid ends of the prior art which are composed entirely of carbon steel. In an alternative embodiment, the inner surface 130 of the fluid end 104 may be composed of a polymeric material which is reinforced by the composite material 134.

In one embodiment the inner surface 130 of the fluid end 104 is composed of either the base material 132, a polymeric material, or carbon steel, and has a material thickness of approximately ¼" or ½". This layer may be thicker with the tradeoff being that the weight and expense of the fluid end 104 increase with increasing thickness to the inner surface 130 of the fluid end 104.

Autofrettage of the fluid end 104, a process often performed on reciprocating pump fluid ends, may be performed. However, even without autofrettage, the implementation of the fibers of the composite material 134 to the fluid end 104 will create compressive strength to the interior section of the fluid end 104.

It is important to note that although fluid ends of reciprocating pump are discussed above, the above described base material 132 with composite material 134 reinforcement may be used for any pressure containing part, or any part that experiences a pressure cycle, and also for parts that need to be light in weight.

For example, FIG. 1 shows a pump assembly 100 having a drive means, such as an engine 110, which drives a pump 102 through a transmission 112. In additional embodiments of the invention, any one or all of the pump 102, the transmission 112 and the engine 110 may be composed of any of the material combinations described above. Such an assembly 100 may be used for an oilfield operation such as a fracturing operation.

In addition, in another embodiment of the invention, a cementing head may be composed of any of the material combinations described above. Such an cementing head may be used in an oilfield cementing operation.

FIGS. 3A-3E show one embodiment for manufacturing a fluid end 304 according to the present invention. In this figure a fluid end 304 is shown in various stages of assembly. In this embodiment, a thin layer of a base material 332 is used. For example, a base material thickness of approximately ¼" or ½" another appropriate thickness may be used. The base material 332 is formed to any appropriate shape for receiving a plunger, a suction valve, and a discharge valve, necessary for forming the reciprocating action of the a reciprocating pump.

Figure 3A:
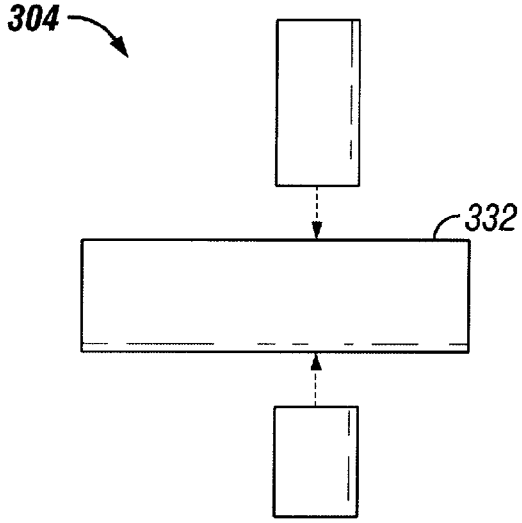
FIGS. 3A-3E show one embodiment for manufacturing a fluid end according to one embodiment of the present invention.
Figure 3B:
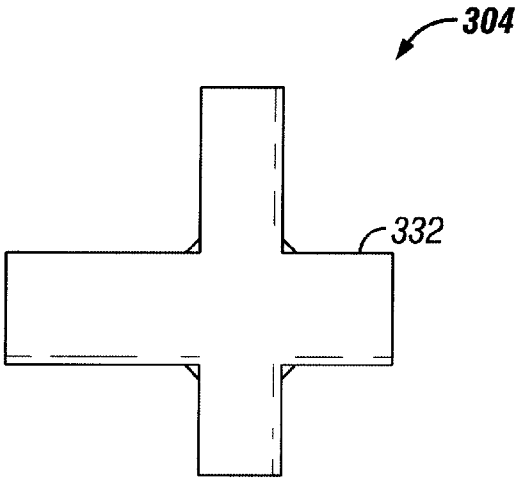
Figure 3C:
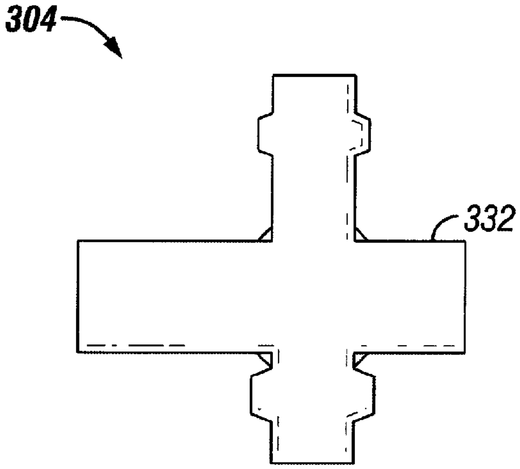

For example, in the depicted embodiment, as shown in FIGS. 3A-3C, three tubes are welded together, and then hydroformed to give the overall geometry of FIG. 3C. In such an embodiment, a plunger may be placed in the leftmost arm of FIG. 3C, and suction and discharge valves may be place in the bottommost and topmost arms, respectively, of FIG. 3C to achieve the appearance of the fluid end 104 of FIG. 2.

Figure 3D:
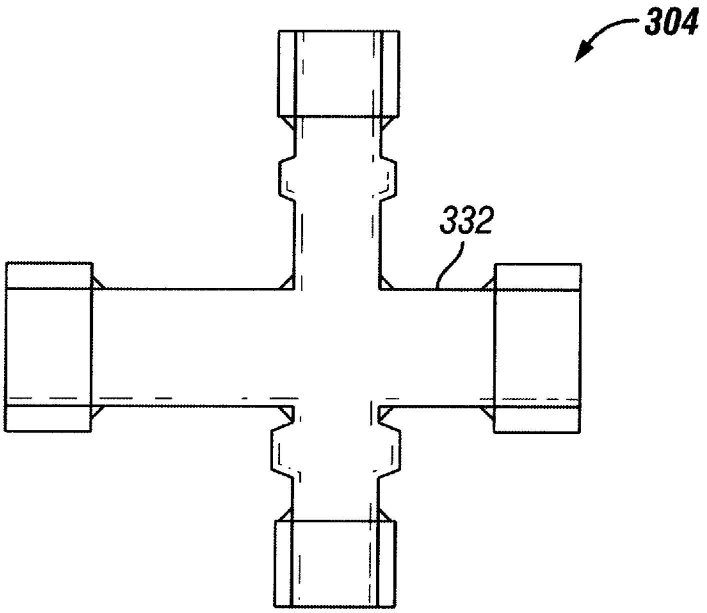
Figure 3E:
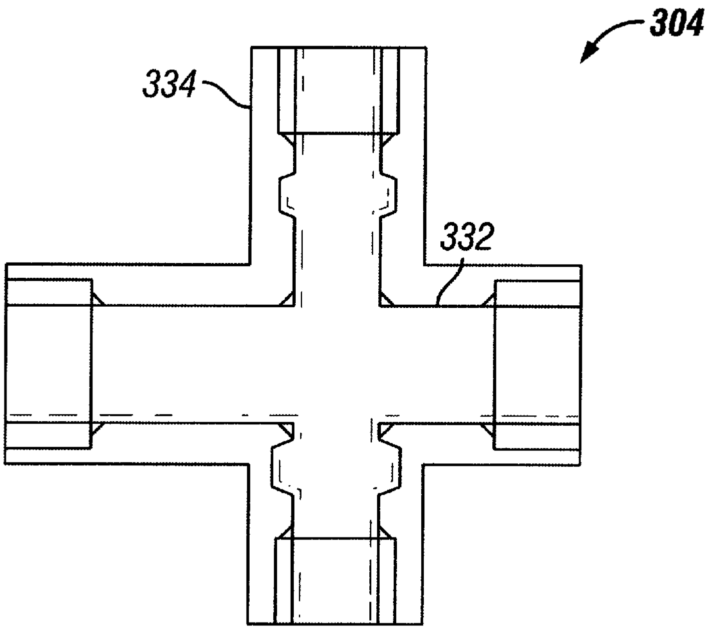

As shown in FIG. 3D, other parts could be added to the fluid end 304 of FIGS. 3A-3C if necessary. For example, threaded parts 350 could be added as showed in FIG. 3D. A composite material 334 may then be applied to the outer surface of the fluid end 304 as shown in FIG. 3E. For example, the composite material 334 may be applied by a filament winding process by using carbon fibers and an epoxy resin, but any appropriate application process and any appropriate composite material 334 composition may be used.

Although, FIGS. 3A-3E show a fluid end 304 with a specific geometry, fluid ends made in accordance with embodiments of the present invention may have any appropriate shape for holding a plunger, and suction and discharge valves necessary for forming the reciprocating action of a reciprocating pump. For example, in one embodiment, the fluid end is a substantially straight tube. In addition, in some embodiments, the fluid end is coated by or otherwise receives the composite without the fluid end being hydroformed or deformed.

Also, a fluid end, or any of the other oilfield equipment described above according to any of the embodiments of the present invention, may include integrated measurement means inside the composite material 134,334 to measure temperature distribution, stress distribution, fluid density, fluid flow rate, electrical conductivity, pH and/or acceleration, among other appropriate properties of the oilfield equipment and/or the fluid therein. These measurement means could be part of the fiber itself, or otherwise added inside the composite material 134,334. In exemplary embodiments, the measurement means may include a sensor, a densitometers, a flow meter, such as an electromagnetic high pressure flow meter, or any combination thereof, among other appropriate measurement means.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A pump assembly comprising:

a drive means;

a transmission coupled to the drive means; and a pump driven by the drive means, wherein the pump comprises an inner surface in contact with a fluid, the inner surface comprising a base material, and said base material being reinforced by a composite material;

wherein the base material of the inner surface is formed in a shape comprising a first tubular arm accommodating a plunger, a second tubular arm, and a third tubular arm, wherein the second tubular arm and the third tubular arm are substantially perpendicular to the first tubular arm;

wherein the composite material is applied to the shape of the formed base material such that the composite material has the same shape as the formed base material, said composite material substantially enveloping the formed base material; and wherein the base material and the composite material comprise different enhanced properties.

2. The pump assembly of claim 1, wherein the base material has enhanced properties in at least one of abrasion resistance, corrosion resistance, erosion resistance and wet fatigue resistance.

3. The pump assembly of claim 1, wherein the base material comprises one of inconel, incoloy, titanium and stainless steel.

4. The pump assembly of claim 1, wherein the base material comprises a polymeric material.

5. The pump assembly of claim 1, wherein the composite material comprises strength members and a matrix.

6. The pump assembly of claim 5, wherein the strength members comprise one of glass fibers, carbon fibers, metal fibers, Kevlar fibers, and metal wires.

7. The pump assembly of claim 5, wherein the matrix comprises one of a thermoplastic material and a thermoset material.

8. The pump assembly of claim 5, wherein the matrix comprises one of an epoxy and Peek.

9. The pump assembly of claim 1, wherein the composite material comprises at least one of a pressure sensor, a temperature sensor, a vibration sensor, a stress sensor, a flow meter and a densitometer embedded therein.

10. A method of performing an oil well operation comprising:

providing a pump according to claim 1 at the oil well; and operating the pump to inject a fluid into the oil well.

11. The method of claim 10, wherein the oil well operation is a fracturing operation and the fluid is a fracturing fluid.

12. A pump assembly comprising:

a drive means;

a transmission coupled to the drive means; and a pump driven by the drive means wherein the pump comprises an inner surface in contact with a fluid, the inner surface comprising a base material, and said base material being reinforced by a composite material;

wherein the base material of the inner surface is formed in a shape comprising a first tubular arm accommodating a plunger, a second tubular arm, and a third tubular arm, wherein the second tubular arm and the third tubular arm are substantially perpendicular to the first tubular arm;

wherein the composite material is applied to the shape of the formed base material such that the composite material has the same shape as the formed base material, said composite material substantially enveloping the formed base material;

wherein the base material has enhanced properties in at least one of abrasion resistance, corrosion resistance, erosion resistance and wet fatigue resistance; and wherein the composite material comprises enhanced properties in stress resistance.

13. The pump assembly of claim 12, wherein the base material comprises one of inconel, incoloy, titanium and stainless steel.

14. The pump assembly of claim 12, wherein the base material comprises a polymeric material.

15. The pump assembly of claim 13, wherein the composite material comprises strength members and a matrix.

16. The pump assembly of claim 15, wherein the strength members comprise one of glass fibers, carbon fibers, Kevlar fibers, metal fibers, and metal wires.

17. The pump assembly of claim 16, wherein the matrix comprises one of a thermoplastic material, and a thermoset material.

18. The pump assembly of claim 16, wherein the matrix comprises of one an epoxy and Peek.

19. The pump assembly of claim 16, wherein the composite material comprises at least one of a pressure sensor, a temperature sensor, a vibration sensor, a stress sensor, a flow meter and a densitometer embedded therein.

* * * * *